May 14, 1929.  E. H. NEWKIRK  1,712,898
INSIDE FISHING TOOL
Filed Nov. 5, 1927
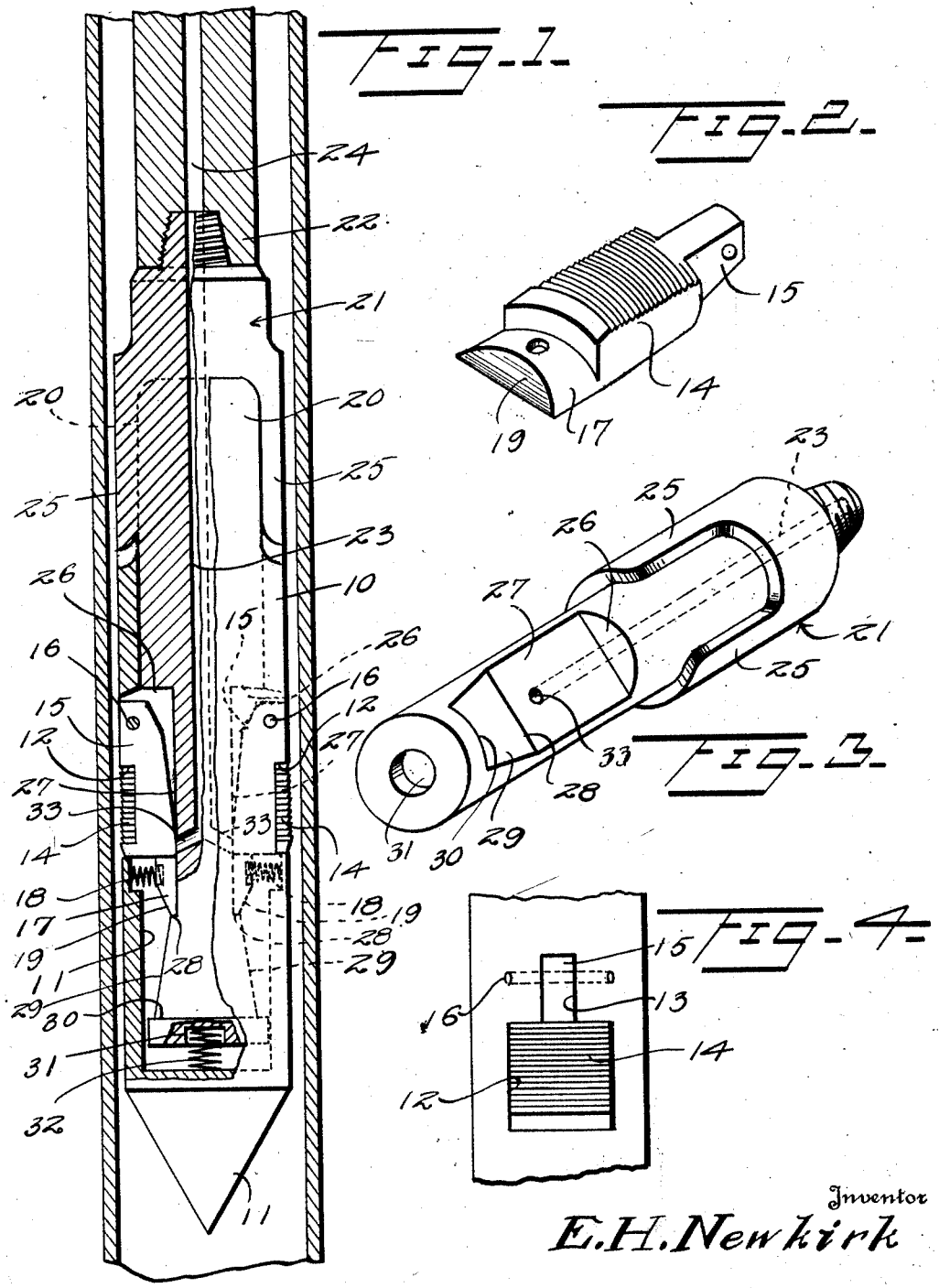
Inventor
E. H. Newkirk
By Watson E. Coleman
Attorney Patented May 14, 1929.

1,712,898

UNITED STATES PATENT OFFICE.

EDGAR H. NEWKIRK, OF OKLAHOMA CITY, OKLAHOMA.

INSIDE FISHING TOOL.

Application filed November 5, 1927. Serial No. 231,315.

This invention relates to fishing tools for use in deep wells and more particularly to an inside fishing tool or tool for interiorly grasping hollow fish, such as pipes, drill stems or the like, which have bores into which the fishing tool may extend.

An important object of the invention is to provide a device of this character in which the gripping elements are positively locked against engagement with the fish until an operation controllable from the upper end of the well bore has been carried out.

A further and more specific object of the invention is to provide a tool, the jaws of which are locked as above stated and which are released upon application of fluid pressure to the tool to permit their positive expansion into engagement with the walls of the fish.

A further object of the invention is to provide a device of this character whereby the jaws may be readily released in event it is found after gripping the fish that the same cannot be moved.

These and other objects I attain by the construction shown in the accompanying drawings, wherein for the purpose of illustration is shown a preferred embodiment of my invention and wherein:—

Figure 1 is an elevation partially in section showing a fishing tool constructed in accordance with my invention;

Figure 2 is a perspective view of one of the jaws removed;

Figure 3 is a perspective view of the plunger removed;

Figure 4 is a fragmentary elevation of the fishing tool at right angles to the view in Figure 1.

Referring now more particularly to the drawing, the numeral 10 generally designates a barrel having a closed and tapered lower end, indicated at 11, which lower end forms a guide leading the barrel into a fish to be engaged. This barrel has a bore 11 and has in its side walls jaw openings 12 which are oppositely arranged and have reduced extensions 13. Jaws 14 are provided having arcuately curved outer faces provided with upwardly facing teeth and having at their upper ends extensions 15 entering the extensions 13 of the openings 12 and pivotally connected to the barrel by pivot pins 16. Each jaw has at its lower end an extension 17 confronting the inner wall of the barrel and curved to fit thereagainst upon its outer face. Between the wall of the barrel and the extension 17, compression springs 18 are arranged, which constantly urge the lower ends of the jaws inwardly, so that the jaws normally occupy a position wherein their toothed outer faces are arranged within the diameter of the barrel 10 and are protected thereby against abrasive engagement which would tend to dull the teeth and injure the engaged element. The lower end faces of the extension 17 provide downwardly facing shoulders 19, the purpose of which will presently appear.

The upper end of the barrel has oppositely disposed upwardly extending wings 20. A plunger 21 is provided which is adapted at its upper end for engagement with a fishing string 22 and has a bore 23 for coaction with the bore 24 of the fishing string. The upper end of the plunger has lugs 25 between which the wings 20 may extend to permit of a limited vertical movement of the plunger and body without relative rotation thereof.

The side faces of the plunger are formed with recesses 26 for the reception of the blades 14. At their upper ends, the inner walls 27 of these recesses are parallel to one another but adjacent their lower ends, they are provided with upwardly facing shoulders 28 and beneath these shoulders, these inner walls diverge downwardly, as indicated at 29. The terminal of the recess forms, at the lower ends of these diverging surfaces which combine to produce a wedge, a second set of upwardly facing shoulders 30. The lower end of the plunger has a spring socket 31 within which is arranged a spring 32 for engagement with the bottom of the barrel bore 11. The bore 23 of the plunger 21 has branch outlets 33 opening through the inner walls of the recesses 26 at the parallel portions thereof.

In the use of the tool, the plunger is first inserted in the body and the jaws 14 then placed in position and anchored by their pivots. The springs 18 at this time will force the jaws inwardly, causing their inner faces to closely engage against the parallel portions 27 of the recess walls and seal the outlets of the openings 33. The tool attached to the string is then lowered into the well until it comes into engagement with the fish and is positioned so that its jaws 14 may grasp the same. Pump pressure is then applied to the tool through the usual pump of the well drilling apparatus (not shown) and this pressure will force the jaws outwardly against the action of the springs 18, thereby releasing the shoulders 19 of the tool from the shoulders 28 of the plunger which, until this time, they have engaged. This releases the barrel 10 for downward movement previously prevented by the engagement of these shoulders and this barrel will move downwardly both by gravity and under the influence of the spring 32 until the jaws 33 engage the inner wall of the fish. At this time, the jaws will be sufficiently spread to enable the downwardly diverging faces 29 of the plunger to be passed between the extensions 17, with the result that by applying strain to the string 22, these faces will act to wedge the jaws firmly into engagement with the fish to enable the same to be withdrawn from the well. If, after a test, it is found that the fish is too firmly anchored to enable its removal, the tool may be released therefrom by cutting off the pumping pressure and forcing the string downwardly. This will permit the jaws 14 to recede under the influence of the spring 18 and when the lower end 11 of the barrel comes into engagement with an obstruction, the plunger will move downwardly with relation to the barrel until the shoulders 28 are again arranged below the shoulders 19 of the blades. If then the string be elevated, these shoulders will come into engagement and the blades will be held in their retracted position, permitting the withdrawal of the tool.

In some cases, it may be necessary to employ the fishing tool where fluid pressure is unavailable to cause an operation thereof. Under these circumstances, the noses 17 of the slips 14 are disengaged from the shoulders 28 before the tool is lowered into the well. The spring 22 is of sufficient length and strength to overcome friction and fluid met with in the well, which would tend to raise the outer body or barrel to a point where the slip noses 17 could re-engage with the shoulders 28. The springs 18 of the slips will, of course, tend to hold the slips inwardly, so that they will not engage the walls of the casing. The friction set up by these springs between the inclined faces 29 and the noses of the slips will serve to support the shell 11 against downward movement, such as would cause an operative projection of the blades. This is particularly true while the tool is moving downwardly and the frictional engagement of the shell with the walls has a tendency to move this shell upwardly. The slips are thus held within the confines of the tool or at least from operative projection therefrom, so that they will not be so positioned as to prevent entry of the tool in the fish. When, however, the plunger is moved upwardly, which operation will occur when the proper point in the well is reached, the friction of the outer case upon the walls of the fish will permit the necessary relative movement of the plunger and barrel to cause these slips to expand into engagement with the walls of the fish, so that a grip may be taken thereon. In this operation as in that originally described, the release is effected by moving the tool downwardly until the barrel encounters an obstruction. The lower ends of the slips preferably have a slight bevel at their inner faces which is shaped to properly fit against the taper of the plunger to provide a solid engagement between the slips and plunger.

Since the construction hereinbefore set forth is capable of a certain range of change and modification without materially departing from the spirit of the invention, I do not limit myself to such specific structure except as hereinafter claimed.

I claim:—

1. In an inside fishing tool, a barrel, a plunger vertically shiftable within the barrel, the barrel having openings in its side walls, jaws pivoted to the barrel and adapted to extend through the openings to grip a fish, means urging said jaws inwardly, downwardly diverging faces on the plunger adapted to coact with the jaws to force the jaws outwardly as the plunger is moved upwardly within the barrel, coacting means upon the jaws and plunger preventing upward movement of the plunger within the barrel and means operable from the upper end of a string to which the plunger is connected for forcing the jaws outwardly to thereby disengage said means and permit the plunger to be moved upwardly.

2. In an inside fishing tool, a barrel, a plunger vertically shiftable within the barrel, the barrel having openings in its side walls, jaws pivoted to the barrel and adapted to extend through the openings to grip a fish, means urging said jaws inwardly, downwardly diverging faces on the plunger adapted to coact with the jaws to force the jaws outwardly as the plunger is moved upwardly within the barrel, coacting means upon the jaws and plunger preventing upward movement of the plunger within the barrel and means operable from the upper end of a string to which the plunger is connected for forcing the jaws outwardly to thereby disengage said means and permit the plunger to be moved upwardly, the jaws and plunger having coacting means positively limiting the upward movement of the plunger.

3. In an inside fishing tool, a barrel, a plunger vertically shiftable within the barrel, the barrel having openings in its side walls, jaws pivoted to the barrel and adapted to extend through the openings to grip a fish, means urging said jaws inwardly, downwardly diverging faces on the plunger adapted to coact with the jaws to force the jaws outwardly as the plunger is moved upwardly within the barrel, coacting means upon the jaws and plunger preventing upward movement of the plunger within the barrel, means operable from the upper end of a string to which the plunger is connected for forcing the jaws outwardly to thereby disengage said means and permit the plunger to be moved upwardly, and a spring engaging the plunger and barrel urging the barrel downwardly upon the plunger when said coacting means are released.

4. In an inside fishing tool, a barrel, a plunger vertically shiftable within the barrel, the barrel having openings in its side walls, jaws pivoted to the barrel and adapted to extend through the openings to grip a fish, means urging said jaws inwardly, downwardly diverging faces on the plunger adapted to coact with the jaws to force the jaws outwardly as the plunger is moved upwardly within the barrel, coacting means upon the jaws and plunger preventing upward movement of the plunger within the barrel, said plunger having a bore, the lower end of the bore communicating with ports opening through opposite sides of the plunger, said jaws having engagement with the plunger when said coacting means are engaged sealing said ports whereby upon the introduction of fluid pressure to the bore the blades are forced outwardly to release said plunger.

5. In an inside fishing tool, a barrel, a plunger vertically shiftable within the barrel, the barrel having an opening in its side wall, a jaw pivoted to the barrel and adapted to extend through the opening to grip a fish, the plunger and jaw having coacting means whereby, when the plunger is moved upwardly within the barrel, the jaw is forced outwardly for engagement with the fish and coacting means upon the jaw and releasable plunger for locking the plunger against vertical movement in the barrel.

6. In an inside fishing tool, a barrel, a plunger vertically shiftable within the barrel, the barrel having an opening in its side wall, a jaw pivoted to the barrel and adapted to extend through the opening to grip a fish, the plunger and jaw having coacting means whereby, when the plunger is moved upwardly within the barrel, the jaw is forced outwardly for engagement with the fish and coacting means upon the jaw and plunger releasable upon a predetermined operation for locking the plunger against vertical movement in the barrel, the jaw and plunger having coacting means positively limiting the upward movement of the plunger.

7. In an inside fishing tool, a barrel, a plunger vertically shiftable within the barrel, the barrel having openings in its side walls, jaws pivoted to the barrel and adapted to extend through the openings to grip a fish, means urging said jaws inwardly, downwardly diverging faces on the plunger adapted to coact with the jaws to force the jaws outwardly as the plunger is moved upwardly within the barrel, coacting means upon the jaws and plunger preventing upward movement of the plunger within the barrel, means operable from the upper end of a string to which the plunger is connected for forcing the jaws outwardly to thereby disengage said means and permit the plunger to be moved upwardly, and a spring urging the barrel downwardly upon the plunger when the last named coacting means are released.

8. In an inside fishing tool, a barrel, a plunger vertically shiftable within the barrel, the barrel having openings in its side walls, jaws pivoted to the barrel and adapted to extend through the openings to grip a fish, means urging said jaws inwardly, downwardly diverging faces on the plunger adapted to coact with the jaws to force the jaws outwardly as the plunger is moved upwardly within the barrel, coacting means upon the jaws and plunger preventing upward movement of the plunger within the barrel, and means for directing fluid pressure introduced through the plunger against the jaws to force them outwardly and thereby release said coacting means.

9. In an inside fishing tool, a barrel, a plunger vertically shiftable within the barrel, the barrel having openings in its side walls, jaws pivoted to the barrel and adapted to extend through the openings to grip a fish, means urging said jaws inwardly, downwardly diverging faces on the plunger adapted to coact with the jaws to force the jaws outwardly as the plunger is moved upwardly within the barrel, coacting means upon the jaws and plunger preventing upward movement of the plunger within the barrel, when the plunger has been moved downwardly a predetermined distance in the barrel, a spring connecting the barrel and plunger and normally maintaining the barrel in elevated position within the plunger preventing engagement of said means and springs forcing the jaws inwardly.

10. In an inside fishing tool, a barrel, a plunger vertically shiftable within the barrel, the barrel having an opening in its side wall, a jaw pivoted to the barrel and adapted to extend through the opening to grip a fish, the plunger and jaw having coacting means whereby, when the plunger is moved upwardly within the barrel, the jaw is forced outwardly for engagement with the fish, coacting means upon the jaw and releasable plunger for locking the plunger against vertical movement in the barrel, and a spring normally preventing engagement of said coacting means after disengagement thereof.

In testimony whereof I hereunto affix my signature.

EDGAR H. NEWKIRK.